United States Patent [19]

Wismer et al.

[11] 4,005,244
[45] Jan. 25, 1977

[54] ULTRAVIOLET LIGHT CURABLE OPACIFYING COMPOSITIONS

[75] Inventors: Marco Wismer, Gibsonia; Paul J. Prucnal, Monroeville; Kenneth E. Miller, Natrona Heights, all of Pa.

[73] Assignee: PPG Industries, Inc., Pittsburgh, Pa.

[22] Filed: Sept. 30, 1974

[21] Appl. No.: 510,187

[52] U.S. Cl. .......................... 428/480; 204/159.12; 204/159.15; 204/159.19; 427/54; 428/500; 428/532

[51] Int. Cl.² .......................................... B05D 3/06

[58] Field of Search ................. 427/53, 54; 260/16, 260/862; 428/480, 500, 532; 204/159.12, 159.15, 159.19

[56] References Cited

UNITED STATES PATENTS

| | | |
|---|---|---|
| 3,573,237 | 3/1971 | Zola ..................................... 427/54 |
| 3,642,672 | 2/1972 | Kroekel ............................... 427/54 |
| 3,669,728 | 6/1972 | Seiner .................................. 427/54 |
| 3,669,729 | 6/1972 | Seiner .................................. 427/54 |
| 3,701,748 | 10/1972 | Krokel ................................ 427/54 |

*Primary Examiner*—John H. Newsome
*Attorney, Agent, or Firm*—George D. Morris

[57] ABSTRACT

Ultraviolet light curable coating compositions comprise an ultraviolet light curable component which shrinks upon curing, a component which is not significantly ultraviolet light curable and a photoinitiator. As the composition is cured by exposure to ultraviolet light, the curable component and the non-curable component phase separate and dendritic microfractures appear at phase boundaries to provide opacity to the cured coatings.

33 Claims, 2 Drawing Figures

ULTRAVIOLET LIGHT CURABLE OPACIFYING COMPOSITIONS

In accordance with this invention, there are provided ultraviolet light curable coating compositions which, upon curing, produce opaque coatings. Although the cured coating composition it itself transmissive of visible light, dendritic microfractures are present in the cured coating which function as light scattering sites to provide opacity to the coating.

The ultraviolet light curable composition is transmissive of both visible and ultraviolet light and consists essentially of a mixture of a first component, a second component and a photoinitiator which, under the influence of ultraviolet light, produces free radicals. The first component is one or more organic ultraviolet light curable polymers. A property of the first component is that it shrinks upon curing. The second component is one or more organic plasticizers, one or more organic thermoplastic polymers or mixtures thereof. The second component is not significantly ultraviolet light curable. Moreover, the second component is substantially miscible with the first component at room temperature before the first component is gelled. As the first component gels under the influence of ultraviolet light, however, the first and second components undergo phase separation. The gelled and phase separated composition is then exposed to ultraviolet light, to heat or to both ultraviolet light and heat to cure the first component and to produce dendritic micorfracturs at phase boundaries.

Figure 1:
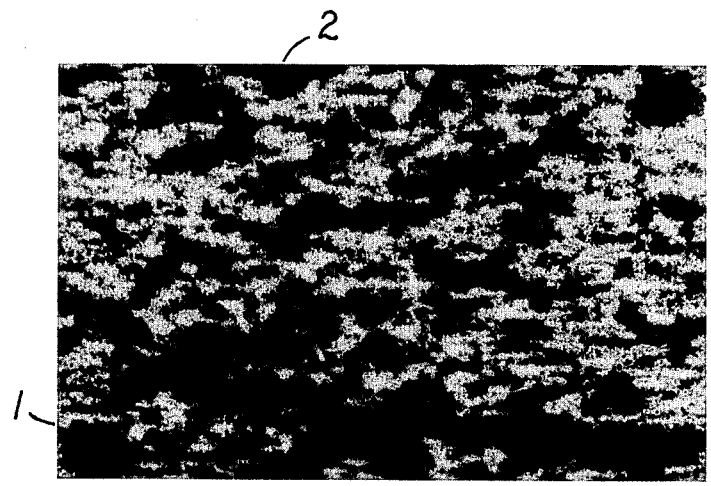
FIG. 1 is a photomicrograph of a cured coating composition of the invention.

There are many types of organic ultraviolet light curable polymers which may be used in the practice of the invention. In general, these polymer molecules contain a plurality of sites of ethylenic unsaturation which, under the influence of ultraviolet light and a photoinitiator, become crosslinking sites through addition reactions. The sites of ethylenic unsaturation may lie along the backbone of the molecule or they may be present in side chains attached to the molecular backbone. As a further alternative, both of these arrangements may be present concurrently.

The ethylenically unsaturated polyesters constitute a particularly preferred class of ultraviolet light curable polymer. These polyesters are oridinarily esterification products of ethylenically unsaturated polycarboxylic acids and polyhydric alcohols. Usually, the ethylenic unsaturation is in the alpha, beta position.

The ethylenically unsaturated polycarboxylic acids include maleic acid, furmaric acie, aconitic acid, itaconic acid, citraconic acid, mesaconic acid, muconic acid and dihydromuconic acid and halo and alkyl derivatives of such acids. The preferred acids are maleic acid and fumaric acid. Especially preferred is maleic acid. Mixtures of ethylenically unsaturated polycarboxylic acids may be used or only a single such acid may be employed. The anhydrides of these acids, where the anhydrides exist, are, of course, embraced by the term "acid", since the polyesters obtained therefrom are essentially the same whether the acid of anhydride is used in the reaction.

One or more saturated polycarboxylic acids may optionally be utilized in combination with the ethylenicaly unsaturated acid or anhydride in the preparation of unsaturated polyesters. Such acids, especially the saturated dicarboxylic acids, increase the length of the polyester without adding additional crosslinking sites, which is a desired feature in some polyesters. Saturated tricarboxylic acids and saturated acids of higher carboxylic functionality may be used to provide branching where this is desirable.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other form of unsaturation which does not react by addition, unless otherwise qualified.

Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutanic acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, 1,2 -hexahydrophthalic acid, 1,3-hexahydrophthalic acid, 1,4-hexahydrophthalic acid, 1,1-cyclobutanedicarboxylic acid and trans-1,4-cyclohexandicarboxylic acid. As in the case of the ethylenically unsaturated polycarboxylic acids, the anhydrides of the saturated acids, where anhydrides exist, are embraced by the term "acid" since the polyesters obtained therefrom are essentially the same.

The ethylenically unsaturated polycarboxylic acids are usually present in an amount in the range of from about 10 mole percent to about 100 mole percent of the polycarboxylic acids employed. Preferably, they are present in the range of from about 50 mole percent to about 100 mole percent.

The polyhydric alcohols useful in preparing ethylenically unsaturated polyesters include saturated polyhydric alcohols such as ethylene glycol, 1,3-propanediol, propylene glycol, 2,3-butane diol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, neopentyl glycol, glycerol, pentaerythritol, erythritol, sorbitol, mannitol, 1,1,1-trimethylolpropane, trimethylolethane, and 2,2-dimethyl-3-hydroxypropyl 2,2-dimethyl-3-hydroxypropionate. Ethylenically unsaturated polyhydric alcohols such as 2-butene-1, 4-diol may be used alone or in admixture with the saturated polyhydric alcohols. Of course, mixtures of saturated polyhydric alcohols or mixtures of unsaturated polyhydric alcohols may be employed. If unsaturated polyhydric alcohols are used to introduce ethylenic unsaturation into the polyester, the preparation of ethylenically unsaturated polycarboxylic acid may be reduced correspondingly, if desired.

The ethylenically unsaturated polyesters may optionally be capped with saturated monocarboxylic acids, ethylenically unsaturated monocarboxylic acids or mixtures of these. Examples of suitable saturated monocarboxylic acids are formic acid, acetic acid, propionic acid, isopropionic acid, butyric acid, isobutyric acid, sec-butyric acid, tert-butyric acid, valeric acid, caproic acid, isocaproic acid, enanthic acid, caprylic acid, pelargonic acid, capric acid, undecylic acid, lauric acid, myristic acid, palmitic acid and stearic acid. Examples of ethylenically unsaturated monocarboxylic acids which may be used are acrylic acid, α-chloroacrylic acid, methacrylic acid, ethyacrylic acid, crotonic acid, tiglic acid, oleic acid, linoleic acid, linolenic acid, ricinoleic, erucic acid and sorbic acid.

Capping may also be accomplished using monohydric alcohols such as methyl alcohol, ethyl alcohol, n-butylalcohol, isobutyl alcohol, sec-butyl alcohol, tert-butyl alcohol, amyl alcohol, hexyl alcohol, heptyl alcohol, octyl alcohol, 2-ethylhexyl alcohol, decyl alcohol and allyl alcohol. Other materials which may be used for capping comprise compounds having other monofunctional groups which react with the terminal hydroxyl groups or the terminal carboxylic groups of the uncapped polyester. Exemplary compounds are alkyl isocyanates such as methyl isocyanate, ethyl isocyanate, propyl isocyanate; primary amines such as methyl amine, ethyl amine, propyl amine; secondary amines such as dimethyl amine, diethyl amine, methyl ethyl amine; acid chlorides such as acetyl chloride, propionyl chloride, and butyryl chloride.

If desired, no effort need be made to cap the ends of the polyester and capping or chain termination may be left to natural processes.

Polymers having ethylenic unsaturation in sidechains attached to the molecular backbone are usually prepared by including one or more monomers which, when interpolymerized with other monomers, to form the polymer, provides reactive sites attached to the polymer along the backbone. Ethylenically unsaturated compounds having at least one functional group which will react with the reactive sites on the polymeric backbone are then used to introduce the ethylenic unsaturation into the molecule. The usual reactive sites attached directly or indirectly to the polymer are hydroxy, amino, carboxy, carbamyl or epoxy. Hydroxy or carboxy are most often used. When the reactive sites are hydroxy, the ethylenically unsaturated compound usually has carboxy, haloformyl (most often chloroformyl) or isocyanato functionality. When the reactive sites on the polymer are amino, the ethylenically unsaturated compound usually has isocyanato, haloformyl (again, most often chloroformyl) or epoxy functionality. When the reactive sites on the polymer are carboxy, the ethylenically unsaturated compound generally has hydroxy, epoxy or isocyanato functionality. When the reactive sites are carbamyl, they are usually reacted with formaldehyde to produce N-methylol carbamyl groups. The ethylenically unsaturated compound ordinarily contains carboxy, haloformyl or isocyanato functionality. When the reactive sites are epoxy (usually glycidyl), the ethylenically unsaturated compound generally has carboxy functionality.

The polymer having reactive sites attached thereto can itself be any of many types, as for example, polyacrylates, polyamides, polyesters, polyethers or polyurethanes.

The term polyacrylate is used in its broadest sense to include not only polymerized unsubstituted acrylates, but also polymerized α-substituted acrylates, such as methacrylates, ethacrylates and α-chloroacrylates. Compounds from any of these subclassed may be used alone, but most often, compounds from two or more subclasses are interpolymerized.

Examples of suitable monomers which may be used in the preparation of the polyacrylate polymer include methyl acrylate, ethyl acrylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylate, heptyl methacrylate, octyl methacrylate, 2-ethylhexyl methacrylate, decyl methacrylate, dodecyl methacrylate methyl α-chloroacrylate, ethyl α-chloroacrylate, propyl α-chloroacrylate, hexyl α-chloroacrylate, octyl α-chloroacrylate, decyl α-chloroacrylate and dodecyl α-chloroacrylate. Esters of unsubstituted acrylic acid and methacrylic acid are most often used.

Acrylic monomers which introduce reactive sites to the polymer molecule are acrylic acid, 2-hydroxyethyl acrylate, 2-hydroxypropyl acrylate, 3-hydroxypropyl acrylate, glycidyl acrylate, acrylamide, 2-aminoethyl acrylate, methacrylic acid, 2-hydroxyethyl methacrylate, 2-hydroxypropyl methacrylate, 3-hydroxypropyl methacrylate, glycidyl methacrylate, methacrylamide, 2-aminoethyl methacrylate, 3-aminopropyl methacrylate and α-chloroacrylic acid.

Other ethylenically unsaturated monomers are often included. Examples of these compounds are styrene and α-methylstyrene.

The amount of acrylic monomers which are used to introduce reactive sites to the polymer molecule may vary widely, but they are ordinarily present in the range of from about 3 percent to about 50 percent by weight of the ethylenically unsaturated monomers interpolymerized. An amount in the range of from about 4 percent to about 25 percent is most often the case.

Addition polymerization may be effectuated by combining the ethylenically unsaturated monomers with a free radical initiator and heating the mixture. Exemplary free radical initiators are organic peroxides such as ethyl peroxide and benzoyl peroxide; hydroperoxides such as methyl hydroperoxide, acyloins such as benzoin; certain azo compounds such as α, α-azobisisobutyronitrile and γ,γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone. In lieu of the chemical free radical initiators, high energy ionizing particles irradiation, high energy ionizing electromagnetic radiation or actinic light may be used as a source of free radicals. High energy ionizing particle radiation inlcudes accelerated electrons; highly accelerated nuclear particles such as protons, neutrons, alpha particles, deuterons and beta particles. High energy ionzing electromagnetic radiation includes X-rays and gamma rays. Actinic light includes ultraviolet light and photons less energetic than ultraviolet light. The polymerization may be accomplished in the presence or absence of an inert solvent. When chemical initiators are used, temperatures in the range of from about 75° F. to about 400° F. are generally employed. More often, temperatures in the range of from about 100° F. to about 300° F. are used.

When the polymer is a polyamide, polyester, polyether or polyurethane, the principles are analogous to those given for the polyacrylates. The known reactions for forming such polymers will, of course, be used instead of the addition polymerization reaction illustrated above for the the polyacrylates.

One or more organic ultraviolet light curable acrylic oligomers, which may be used as the first component in the invention, generally comprise divalent, trivalent or tetravalent organic radicals whose bonds are satisfied with unsubstituted acryloxy or α-substituted acryloxy groups. The polyvalent radical may be aliphatic, cycloaliphatic or aromatic. Usually, the molecular weight of the oligomer is in the range of from about 170 to about 1000. Examples of such oligomers are the diacrylates and dimethacrylates of ethylene glycol, 1,3propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, d propylene glycol, neopentyl glycol, 5,5-dimethyl-3,7-dioxanonane-1,9-diol and 2,2-dimethyl-3-hydroxypropyl 2,2-dimethyl-3-hydroxypropionate; the triacrylates, trimethacrylates, diacrylates and dimethacrylates of glycerol, 1,1,1-trimethylolpropane and trimethylolethane; and the tetracrylates, tetramethacrylates, triacrylates, trimethyacrylates, diacrylates and dimethacrylates of pentacrythritol and erythritol. The acrylic groups on the oligomer molecules are usually the same, but they may be different as exemplified by the compound 2,2-dimethyl-1-acryloxy-3-methacryloxypropane.

Other examples of satisfactory acrylic oligomers are acrylic polyester and acrylic polyamides molecules represented by the formulae

 (I)

and

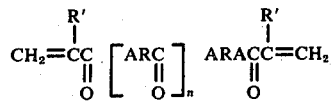 (II)

n is an integer in the range of from 1 to 4;
each R independently represents a divalent aliphatic, cycloaliphatic or aromatic hydrocarbon radical having from 1 to 10 carbon atoms;
each R' independently represents hydro, methyl or ethyl;
and each A independently represents O or NH.

It is preferred that every A represent O. The polyester and polyamide oligomers represented by formula (I) may be prepared by reacting dicarboxylic acids or acid amides and dihydric alcohols or diamines and then reacting the product with an unsubstituted acrylic acid or an α-substituted acrylic acid. The acrylic polyester and polyamide oligomers, represented by formula (II) may be prepared by reacting a hydroxyfunctional monocarboxylic acid, a dimer, trimer or a tetramer of such acid, an amino functional monocarboxylic acid or a dimer, trimer or tetramer of such acid with an unsubstituted or α-substituted acrylic acid. Where desired, the lactone may be used in lieu of the hydroxy functional monocarboxylic acid and the lactam may be used in place of the amino functional monocarboxylic acid.

The first component is usually present in the coating composition in an amount in the range of from about 30 to about 98 percent by weight of the binder of the coating composition. More often, it is in the range of from about 60 to about 97 percent by weight of the binder. From about 70 to about 96 percent by weight of the binder is typical.

The second component of the invention does not possess the ethylenic unsaturation which would permit ultraviolet light curing. It is preferred that no ethylenic unsaturation be present; however, an occasional ethylenically unsaturated group in or along the molecule will do no harm if it does not prevent phase separation of the first and second components upon gellation of the first component. Moreover, ethylenically unsaturated monomers or acrylic oligomers may be imbibed in the second component during or after phase separation without interfering with the ultimate microfracturing process. Indeed, the polymerization of imbided monomer or oligomer in the thermoplastic phase may actually enhance the microfracturing process through formation of additional polyphase microfractures or by causing shrinking of the thermoplastic phase.

Examples of organic plasticizers which may be used as the second component are methyl stearate, ethyl stearate, amyl stearate, 2-methxyethyl stearate, 2-ethoxyethyl stearate 2-butoxyethyl stearate, chlorinated biphenyl, chlorinated paraffin, di(2-ethylhexyl) phthalate, diisooctyl phthalate, dibutyl phthalate, octyl decyl phthalate, dicapryl phthalate, di(2-methoxyethyl) phthalate, butyl benzyl phthalate, di(2-ethoxyethyl) phthalate, di(2-butoxyethyl) phthalate, bius[2-(2-ethoxyethoxy)ethyl] phthalate, dicyclohexyl phthalate, di(2-ethylhexyl) hexahydrophthalate, butylphthalyl butyl glycollate, methylphthalyl ethyl glycollate, tricresyl phosphate, triphenyl phosphate, triphenyl phosphate, tri(2-ethylhexyl) phosphate, tri(butoxyethyl) phosphate, cresyl diphenyl phosphate, actyl diphenyl phosphate, tributyl phosphate di(2-ethylhexyl) adipate, diisooctyl adipate, octyl decyl adipate, di(butoxyethyl)adipate, isooctyl decyl adipate, diisodecyl adipate, di(2-ethylhexyl) sebacate, dibutyl sebacate, triethylene glycol bis(2-ethylhexoate), polyethylene glycol bis(2-ethylhexoate), sucrose acetate isobutyrate, sucrose acetate, dibutyl azelate, di(2-ethylhexyl) azelatem tributyl citrate, trioctyl citrate, dibutyl tartanate, di(2-ethylhexyl) tartarate, 2-ethylhexyl butyrate, decyl butyrate, butyl laurate, 2-ethylhexyl laurate, decyl acetate, 2-ethylhexyl propionate, octylpropionate, decyl propionate, octyl lactate, decyl lactate, hexyl benzoate, and 2-ethylhexyl benzoate.

The thermoplastic acrylic polymers are one class of organic thermoplastic polymer which is suitable for use as the second component. These polymers are essentially free of groups which would provide crosslinking under the conditions of use. Most often, the acrylic polymers are homopolymers of interpolymers of alkyl esters of unsubstituted or α-substituted acrylic acid. Exemplary monomers include methyl acrylate, ethyl acrylate, propyl acrylate, isopropyl acrylate, butyl acrylate, isobutyl acrylate, sec-butyl acrylatem tert-butyl acrylate, amyl acrylate, hexyl acrylate, heptyl acrylate, octyl acrylate, 2-ethylhexyl acrylate, decyl acrylatem dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylatem heptyl methacrylate, octyl methacrylate, 2-ethylhexyl methacrylate, decyl methacrylate, dodecyl methacrylate, methyl ethacrylate, ethyl ethacrylate, octyl ethacrylate, methyl α-chloroacrylate, ethyl α-chloroacrylate, propyl α-chloroacrylate, hexyl α-chloroacrylate and dodecyl α-chloroacrylate. Esters of unsubstituted acrylic acid and methacrylic acid are most often used. Minor amounts of compounds which contain functional groups such as acrylic acid, methacrylic acid, 2-hydroxyethyl acrylate, 2-hydroxypropyl acrylate, 3-hydroxypropyl acrylate, 2-hydroxyethyl methacrylate, 2-hydroxypropyl methacrylate and 3-hydroxypropyl methacrylate may be used so long as the reactive sites do not interfere with the phase separation of the thermoplastic polymer from the first component during gelling of the latter. Other ethylenically unsaturated monomers are often included with the acrylic monomers. Examples are styrene and α-methylstyrene.

Thermoplastic polyamides which are miscible with the first component are also satisfactory as the second component. The polyamides may be the reaction product of saturated polycarboxylic acids and saturated polyamines. They may also be polymers of saturated monoamino substituted monocarboxylic acids or of saturated lactams. Examples of thermoplastic polyamides are Versamide polyamide resins 900, 930, 940 and 950 950 (General Mills, Inc.). These Versamide polyamide resins are derived from the reaction of dimerized linoleic acid with ethylene diamine and have molecular weights of from about 6000 to about 9000.

Thermoplastic polyesters comprise still another class useful as the second component. Usually, these polyesters are the esterification product of saturated polycarboxylic acids and saturated polyhydric alcohols. Usually, they are the esterification product of saturated dicarboxylic acids and saturated dihydric alcohols. Alternatively, the polyesters may be polymers of saturated monohydroxy substituted monocarboxylic acids or of saturated lactones. Examples of useful saturated polycarboxylic acids include oxalic acid, malonic acid, succinic acid, methylsuccinic aid, 2,2-dimethylsuccinic acid, 2,3-dimethylsuccinic acid, hexylsuccinic acid, glutanic acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid. The anhydrides of the saturated acids, where anhydrides exist, are embraced by the term "acid" since the polyesters obtained therefrom are essentially the same.

The useful saturated polyhydric alcohols include ethylene glycol, 2,3-butanediol, 1,4-butanediol, 2-ethylbutane-1,4-diol, 1,5-pentanediol, 1,6-hexanediol, 1,7-heptanediol, 1,8-octanediol, 2-ethylhexane-1,6-diol, 1,9-nonanediol, 1,10-decanol, 2,10-decanediol, 1,4-cyclohexanediol, 1,4-dimethylolcyclohexane, 2,2-diethylpropane-1,3diol 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, dipropylene glycol, neopentyl glycol, glycerol, pentaerythritol, erythritol, sorbitol, mannitol, 1,1,1-trimethylolpropane, trimethylolethane and 2,2-dimethyl-3-hydroxypropyl 2,2-dimethyl-3-hydroxypropionate. Mixtures of saturated polycarboxylic and mixtures of saturated polyhydric alcohols may, of course, be used.

Thermoplastic polyurethanes are also useful as the second component. Essentially, the thermoplastic polyurethanes are thermoplastic condensation products of a polyisocyanate and a compound having at least two reactive hydrogens, i.e., hydrogen atoms determinable by the Zerewithinoff method. The polyurethanes may be the reaction product of saturated polyisocyanates and saturated polyhydric alcohols, polyesters having at least two hydroxy groups, which are prepared from saturated polycarboxylic acids and saturated polyhydric alcohols, polyalkalene ethers having at least two hydroxy groups, polythioether glycols, polyester amides, etc. Usually, diisocyanates and compounds having two reactive hydrogen atoms are used.

The polyesters of polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., acids, with polyalcohols, such as ethylene glycol, diethylene glycol, pentaglycol, glycerol, sorbitol, triethanolamine, di-(beta-hydroxyethyl)ether, etc., and/or aminoalcohols such as ethanolamine, 3-aminopropanol, 5-aminopentanol-1,10-aminodecanol, 6-amino-5-methylhexanol-1, p-hydroxymethyl-benzylamine, etc. and with mixtures of the above polyalcohols and amines, ethylenediamine, 3-methylhexamethylenediamine, decamethylenediamine and m-phenylenediamine, etc., and/or amino-alcohols, etc. In the esterification or amide formation, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methylpentanediol-2,4,2-ethylhexanediol-1,3,hexamethylene glycolm styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any saturated organic compound containing at least two radicals selected from the class consisting of hydroxyl and carboxyl groups may be employed.

The organic polyisocyanates useful for the production of the thermoplastic polyurethanes include ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, o-diisocyanatobenzene, m-diisocyanatobenzene, p-diisocyanatobenzene, bis(4-isocyanatocyclohexyl)methane, bis(4-isocyanatophenyl)-methane, toluene diisocyanate (which commercially is a mixture comprising about 80 percent 2,4-diisocyanatotoluene and about 20 percent 2,6diisocyanatotoluene, 3,3'-dichloro-4,4'-diisocyanatobiphenyl, tris(4-isocyanatophenyl)methane, 1,5-diisocyanatonaphthalene hydrogenated toluene diisocyanate, 1-isocyanatomethyl-5-isocyanato-1,3,3-trimethylcyclohexane, and 1,3,5-tris(6-isocyanatohexyl)biuret. Also included are polyisocyanates in a blocked form such as the bis(phenylcarbamate) of toluene diisocyanate and the bis(phenylcarbamate) of 1,5-diisocyanatonaphthalene.

The thermoplastic polyureas comprise still another class of polymer which is satisfactory for use in this invention. The thermoplastic polyureas are generally made by the reaction of a saturated polyisocyanate and a saturated polyamine. Any of the saturated polyisocyanates used in the preparation of polyurethanes may be used to prepare polyurea resins. Examples of saturated polyamines are ethylenediamine, hexamethylene diamine, diethylenetriamine and triethylenetetramine. Diisocyanates and diamines are ordinarily used.

Cellulose polymers are satisfactory thermoplastic polymers for use as the second component. Suitable thermoplastic cellulose polymers include cellulose acetate, cellulose acetate butyrate, cellulose acetate propionate, cellulose propionate, cellulose triacetate, cellulose nitrate.

Thermoplastic polymers particularly useful as the second component are the vinyl polymers. Examples are poly(vinyl acetate), poly(vinyl alcohol), poly(vinyl chloride), poly(vinyl chloride-acetate), poly(vinyl dichloride), poly(vinyl fluoride), poly(vinyl acetal), poly(vinyl formal), poly(vinyl butyral), poly(vinyl isobutyl ether), poly(vinyl methyl ether), poly(vinyl isobutyl ether), poly(vinylpyrrolidone), poly(ethylenevinyl acetate) and styrene.

The thermoplastic polyethers are also useful as the second component. These may be attained, for example, by etherification of a polyphenol with epichlorohydrin or dichlorohydrin in the presence of an alkali. The polyphenol is usually a diphenol. Examples of polyphenols which may be used are 2,2-bis(4-hydroxyphenyl) propane (viz., bisphenol A), 1,1-bis(4hydroxyphenyl)ethane, bis(2-hydroxynaphthyl)methane, 1,5-dihydroxynaphthalene or the like. The polyphenol can also be a novolak resin or a similar polyphenol resin. When diphenols are used, the polyethers correspond to the average formula

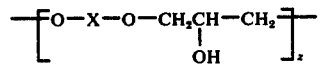

in which X represents an aromatic radical and z represents a whole or fractional small number.

Examples of this class of polyepoxides are the reaction products of Bisphenol A and epichlorohydrin, which correspond to the structure:

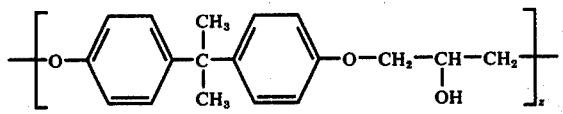

in which z represents a whole or fractional small number.

Also suitable as the second component are the polyethers of polyhydric saturated aliphatic or saturated alicyclic alcohols which may be derived from polymerization of the corresponding alkylene oxide. Examples of alkylene oxides which may be used are ethylene oxide, propylene oxide, 1,3-butylene oxide, tetrahydrofuran and 1,2-cyclohexylene oxide.

Reactive terminal groups of the thermoplastic polymers may optionally be reacted with saturated monofunctional compounds which will react therewith in order to cap the thermoplastic polymer. Similarly, reactive groups which are attached directly or indirectly to the thermoplastic polymer backbone may optionally be reacted with saturated monofunctional compounds which will react therewith. Hydroxyl groups, for example, may be reacted with saturated monocarboxylic acids, saturated monoisocyanates or saturated acyl halides. Carboxyl groups may be reacted with saturated monohydric alcohols, saturated monoisocyanates, saturated primary amines or saturated secondary amines. Isocyanate groups may be reacted with saturated monohydric alcohols, saturated monocarboxylic acids, saturated primary amines, saturated secondary amines and saturated monofunctional acid amides. Epoxy groups may be reacted with a variety of compounds including saturated monohydric alcohols and saturated monocarboxylic acids.

Examples of suitable saturated monocarboxylic acids are formic acid, acetic acid, propionic acid, isopropionic acid, butyric acid, isobutyric acid, sec-butyric acid, tert-butyric acid, valeric acid, caproic acid, isocaproic acid, enanthic acid, caprylic acid, pelargonic acid, capric acid, undecylic acid, lauric acid, myristic acid, palmitic acid and stearic acid.

Examples of saturated monohydric alcohols are methyl alcohol, ethyl alcohol, n-butyl alcohol, isobutyl alcohol, sec-butyl alcohol, tert-butyl alcohol, amyl alcohol, hexyl alcohol, heptyl alcohol, octyl alcohol, 2-ethylhexyl alcohol, decyl alcohol and cyclohexylalcohol.

Exemplary saturated monofunctional isocyanates are alkyl isocyanates such as methyl isocyanates, ethyl isocyanate, propyl isocyanate, isopropyl isocyanate, butyl isocyanate, sec-butyl isocyanate, isobutyl isocyanate and tert-butyl isocyanate. Cyclic isocyanates such as cyclohexyl isocyanate and phenyl isocyanate are suitable.

Suitable primary and secondary amines include methyl amine, ethyl amine, propyl amine, butyl amine, diemthyl amine, diethyl amine, dipropyl amine, methyl ethyl amine and methyl propyl amine.

The saturated acyl halides are exemplified by acetyl chloride, propionyl chloride, butyoyl chloride, acetyl bromide, propionyl bromide and butyryl bromide.

The second component is usually present in the coating composition in an amount in the range of from about 1 to about 30 percent by weight of the binder of the coating composition. From about 3 to about 20 percent by weight of the binder is typical.

The photoinitiator is a compound which, under the influence of ultraviolet light, produces, directly or indirectly, free radicals. Various common photoinitiators are benzoin, methyl benzoin ether, isopropyl benzoin ether, butyl benzoin ether, isobutyl benzoin ether, amyl benzoin ether, chloromethylbenzophenone benzil, benzophenone, xanthone, acetophenone, anthroquinone, diphenyl disulfide and dibenzyl disulfide, to name but a few. Usually, the photoinitiator is present in the coating composition in an amount in the range of from about 0.01 to about 10 percent by weight of the binder of the coating composition. Most often, the photoinitiator is present in an amount in the range of from about 0.1 to about 5 percent by weight of the binder.

Vinyl monomers which crosslink with the first component to form thermosetting materials may be present in the coating composition. Vinyl monomers are especially used with the unsaturated polyesters. Examples of vinyl monomers which may be used are styrene, α-methylstyrene, divinylbenzene, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate. The preferred vinyl monomers are liquid compounds miscible with the first component. These vinyl monomers are preferably free of non-aromatic carbon-carbon conjugated double bonds. The use of one or more vinyl monomers is desirable because the greater mobility of the smaller vinyl monomer molecule, as compared to the much larger first component, allows crosslinking to proceed faster than if the vinyl monomer were absent. Another benefit is that the vinyl monomer usally acts as a reactive solvent for the first component thereby providing coating compositions having a satisfactorily low viscosity without using an inordinant amount, if any at all, of volatile, non-reactive solvent.

The vinyl monomer, or mixtures of vinyl monomers, may be employed over a broad range. At the lower end of the range, no vinyl monomer need be used. The upper end of the range is a moderate excesses of vinyl monomer over the stoichiometric amount required to crosslink the ethylenic unsaturation of the first component. The amount of monomer should be sufficient to provide a liquid, flowable, interpolymerizable mixture. Ordinarily the monomer will be present in the coating compsition in the range of from about 0 to 45 percent by weight of the binder of the coating composition. When used, the vinyl monomer will ordinarily be in the range of from about 15 to about 30 percent by weight of the binder.

Extender pigments which are generally transparent to both ultraviolet light and visible light are optional ingredients which are often included in the coating composition. Examples of suitable extender pigments are finely divided particles of silica, barytes, calcium carbonate, talc, magnesium, silicate, aluminum silicate, etc. The extender pigments do not ordinarily provide significant additional hiding, but they accelerate the rate at which opacity is obtained. Extender pigment is generally present in an amount in the range of from about 0 to about 40 percent by weight of the coating composition. An amount in the range of from about 0 to about 15 percent is more often employed. When extender pigment is used, it is usually present in the range of from about 1 to about 15 percent by weight of the coating composition. Although a single extender pigment is ordinarily used, mixtures of several extender pigments are satisfactory.

Another optional ingredient which is often included in the coating compostion is an inert volatile organic solvent. Mixtures of several inert volatile organic solvents may be used when desired. Like the extender pigment, the inert volatile organic solvent does not ordinarily provide significant additional hiding, but it accelerates the rate at which opacity is obtained. Examples of suitable inert volatile organic solvents are acetone, methyl ethyl ketone, methyl isobutyl ketone, methyl alcohol, ethyl alcohol, propyl alcohol, isopropyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. Solvent of this type is ordinarily present in the coating composition in the range of from about 0 to about 40 percent by weight of the vehicle of the coating composition. From about 0 to about 15 percent is typical. When inert volatile organic solvent is used, it is usually present in the range of from about 1 to about 15 percent by weight of the vehicle.

The coating compositions of the invention are usually prepared by simple admixing the various ingredients. Although mixing is usually accomplished at room temperature, elevated temperatures are sometimes used. The maximum temperature which is usable depends upon the heat stability of the ingredients. Temperatures above about 200° C. are only rarely employed.

The ultraviolet light curable coating composition of the invention is generally used to form cured adherent opaque coatings on substrates. The substrate is coated with the coating composition using substantially any technique known to the art. These include spraying, curtain coating, dipping, roller application, printing, brushing, drawing and extrusion. The coated substrate is then exposed to ultraviolet light to gel the first component and to cause the first component and the second component to undergo phase separation. The coated substrate is then exposed to ultraviolet light, heat or both ultraviolet light and heat to cure the first component and to produce dendritic microfractures at phase boundaries. These dendritic microfractures function as light scattering sites and thereby provide opacity to the cured coatings.

Although it is not desired to be bound by any theory, it is believed that the following mechanism can account for the observed opacity which is formed during curing. As the first component gels (b-stage), the molecular weight of the first component increases due to crosslinking and its miscibility with the second component decreases. Phase separation occurs. Since crosslinking results in shrinkage of the first component, cntinued crosslinking sets up stresses in the coating. When the stresses are great enough, microfractures of a characteristic dendritic pattern form. Dendritic microfracturing is not uniform throughout the coating, but is greatest in the locations of greatest stress. Anything which will concentrate the stresses will serve to preferentially produce dendritic microfracturing in that region. Stess concentrators which have been observed to produce dendritic microfracturing include phase boundaries including especially the substrate-coating interface, microvoids, bubbles, extender pigment particles and debris.

Differences in coefficients of thermal expansion between phases also allows high stresses to be induced. This is believed to be why heat is desirable during crosslinking of the first component from the gelled state (b-stage) to the substantially fully cured state (C-stage). It is theorized that as heat is applied, the thermosetting phase contracts due to the shrinkage induced by crosslinking while the unreactive thermoplastic phase expands due to simple thermal expansion. After the first component has reached C-stage, both phases are cooled and contract. The induced stresses are relieved through dendritic microfracturing.

FIG. 1 is a photomicrograph of cured coating composition of the invention taken using reflected light. The dendritic microfractures 1 are light in comparison to the cured coating composition 2 which is dark.

Figure 2:
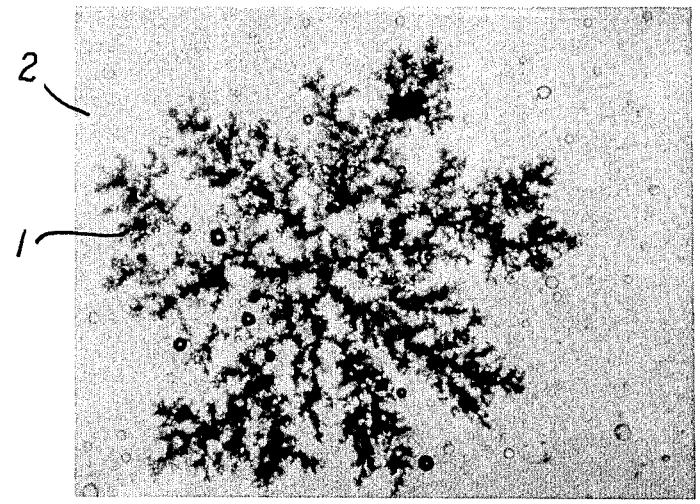
FIG. 2 is a photomicrograph of a curing coating coating composition of the invention.

FIG. 2 is a photomicrograph of coating compostion of the invention during the early stages of curing taken using transmitted light. The dendtrictic microfractures 1 are dark as compared with the curing coating composition 2 which is light. This FIGURE shows dendritic microfractures in the process of propagating from a central site of initial stress concentration. The highly branched structure characteristic of dendritic microfracture is clearly evident.

It has been observed that the concentration of dendritic microfracturing is greatest at or very near the coating-substrate interface and drops off rapidly as the distance from the substrate increases. Ordinarily, substantially no dendritic microfractures are found near the surface of the coating remote from the substrate unless coatings of very low thickness are prepared. Such coatings are analogous to a thin microfractured layer which is overlain by a substantially impervious barrier layer. Accordingly, such coatings have the benefit of the opacity provided by microfracturing without the disadvantages accompanying porosity such as low stain resistance, high water permeability and low mar resistance. It is especially advantageous that such coatings may be obtained in one application. This is particularly appreciated when thin microporous coatings are overcoated in an attempt to provide improved film properties only to find that the overcoating composition has migrated into the pores and opacity is markedly reduced. It has been found that if a series of cured coatings of decreasing thicknesses is prepared, the thicknesses of the substantially impervious barrier layer and the microfractured layer both decrease, but that the thickness of the former diminishes at a greater rate than that of the latter. Coatings somewhat less than a mil in thickness have been prepared having a substantially impervious barrier layer. The precise limit depends upon the particular coating compostion and curing conditions. Most coatings have a thickness of at least about one mil can be formed which have a substantially impervious barrier layer. Usually such coatings have a thickness of at least about 3 mils.

In crosslinking the first component from B-stage to C-stage, ultraviolet light and heat are both ordinarily used. Ultraviolet light may, of course, be used alone since it will interact with the photoinitiator to produce free radicals for crosslinking. Although not ordinarily preferred, heat alone may often be used alone if sufficient free radicals remain in the composition from the ultraviolet light induced crosslinking to B-stage. Sometimes it is advantageous to almost bring the coating from B-stage to C-stage with ultraviolet light or with ulraviolet light and heat, and then to complete the cure with heat alone, usually by baking.

Optical opacity, for example hiding in a paint film, is achieved either by absorption of the incident light or by scattering of the incident light or a combination of these two. Thus, black is opaque because it absorbs the light incident on it and white is opaque because it backscatters the incident light. Light is either absorbed or scattered before it can reach the substrate. The ideal microvoid or white pigment, then, is one which has zero absorption and maximum scattering.

Absorption depends primarily on the electronic structure of the molecule as well as on the size of the microvoid or pigment particle relative to the wavelength of light. Scattering depends on the relative refractive indices of microvoid or pigment and the binder as well as on the size of microvoid or pigment particle relative to the wavelength of incident light.

One simple description of the relation of the scattering and absorption to the resulting reflectance is that of Kubelka and Munk. At complete hiding, the following equation applies:

$$\frac{(1-R_\infty)^2}{2R_\infty} = \frac{K}{S} \quad \text{(Equation 1)}$$

where $R\infty$ is the reflectance of a film or so thick that a further increase in thickness does not change the reflectance, K is the absorption coefficient and S is the Kubelka-Munk scattering coefficient. The reflectance $R\infty$ refers only to internal reflectance and does not include the surface reflectances, and hence Equation 1 applies only to internal reflectance.

The fractions contributed by more than one microvoid or by more than one pigment or by combinations of microvoids and pigments in a system are additive as shown by the following equation:

$$\frac{(1-R_\infty)^2}{2R_\infty} = \frac{C_1K_1+C_2K_2+C_3K_3+\ldots}{C_1S_1+C_2S_2+C_3S_3+\ldots} \quad \text{(Equation 2)}$$

where $C_1$, $C_2$ and $C_3$ refer to the concentrations of pigments or microvoids 1, 2, 3, etc.

When hiding is incomplete, the following equations apply:

$$R = \frac{1 - R_g(a - b\,ctgh\,bSX)}{a - R_g + b\,ctgh\,bSX} \quad \text{(Equation 3)}$$

$$SX = \frac{1}{b}\,Ar\,ctgh\,\frac{1-aR_0}{bR_0} \quad \text{(Equation 4)}$$

where $R_g$ is the measured reflectance of the background to which the coating is subsequently applied, R is the internal reflectance of the coating applied to the background of reflectance $R_g$, $R_o$ is the internal reflectance of the coating applied to an ideal black background of zero reflectance, X is the thickness of the coating in mils, ctgh refers to the hyperbolic cotangent, Ar ctgh refers to the inverse hyperbolic cotangent, $$a = (S+K)/S \quad \text{(Equation 5)}$$

and $$b = (a^2 - 1)^{1/2} \quad \text{(Equation 6)}$$

where S and K are as defined above.

The value of $a$ may be found from the relations $$a = \frac{1}{2}\left[R + \frac{R_0 - R + R_g}{R_0 R_g}\right] \quad \text{(Equation 7)}$$

or $$a = \frac{1}{2}\left[\frac{1}{R_\alpha} + R_\alpha\right] \quad \text{(Equation 8)}$$

The value of K may be found from the equation $$K = S(a-1) \quad \text{(Equation 9)}$$

Since microvoids provide little or no absorption, the value of K is very nearly zero when only microvoids are present. When the value of K is zero, $R_\infty = 1$, $a = 1$, $b = 0$ and the value of S is indeterminate from Equations 1, 3 or 4. In this case Equation 3 simplifies to $$R = \frac{SX(1-R_g) + R_g}{SX(1-R_g) + 1} \quad \text{(Equation 10)}$$

which, when rearranged and solved for S becomes $$S = \frac{R - R_g}{X(1 - R_g)(1 - R)} \quad \text{(Equation 11)}$$

[See P. E. Pierce, S. Babil and J. Blasko, "Hiding Power of Microvoids in Polymer Coatings" Ind. Eng. Chem., Prod. Res. Develop., Volume 13, No. 1, 1974, pages 37–40.] In order for the calculated value of S to contain the maximum number of significant figures, the quantities $R-R_g$, $1-R_g$ and $1-R$ in Equation 11 should be as large as possible. This is achieved by employing the internal reflectance of the coating applied to an ideal black background of zero reflectance. In other words, conditions are chosen such that $R_g=0$ and $R=R_0$. Substituting these values into Equation 11 and simplifying, results in the equation $$S = \frac{R_0}{X(1-R_0)} \quad \text{(Equation 12)}$$

The reflectances $R_\infty$, R and $R_0$ are internal reflectances. Measured reflectances should be corrected for the surface reflectances according to the following equation:

$$R = \frac{R' - k_1}{(1-k_1)(1-k_2) - k_1 k_2 + k_2 R'} \quad \text{(Equation 13)}$$

R' is the measured reflectance of the coating applied to a background of reflectance $R_g$, R is the internal reflectance as defined above, $k_1$ is the first surface Fresnel reflection (gloss), and $k_2$ is the correction for the reflectance from the underside of the coating-air interface. Values of 0.04 for $k_1$ and 0.40 for $k_2$ are used in these calculations. [See further J. L. Saunderson, J. Opt. Soc. Am. Vol. 32, (1942) pages 727–736.]

The Kubelka-Munk analysis is discussed in further detail by D. B. Judd in *Color in Business, Science and Industry*, John Wiley and Sons, Inc., New York, 1952, pages 314–338; and by D. B. Judd and G. Wyszecki in *Color in Business, Science and Industry*, 2nd Edition, John Wiley and Sons, New York, 1963, pages 387–413, the disclosures of which are incorporated herein by reference.

The composition to be tested may be applied at various controlled film thicknesses over white and black glass or over white and black Morest paper charts and cured using ultraviolet light. The reflectances are preferably measured with a recording spectrophotometer. The reflectances, using light having a wavelength of 560 nanometers, should be recorded for the coating over white, the coating over black and the white background, all measurements being made relative to a white standard of known average absolute reflectance. All readings should be corrected to absolute reflectance by multiplying them by the average absolute reflectance of the white standard to obtain the values for R', $R_o'$ and $R'_g$, respectively. A pressed $BaSO_4$ white standard having an average absolute reflectance equal to about 97.5 percent is commonly used. Hence, when using this standard, the readings are multiplied by 0.975.

The calculation procedure is as follows: Substitute the values of R', $R_o'$ and $R'_g$ into Equation 13 to obtain R, $R_o$ and $R_g$, respectively. Substitute R, $R_o$ and $R_g$ into Equation 7 to find *a. incorporated by*

If the value of *a* is equal to unity, K is equal to zero and S is determined by substituting $R_o$ and X into Equation 12.

If the value of *a* is greater than unity, K is not equal to zero and *b* is determined by substituting *a* into Equation 6. S is then calculated by substituting *a*, *b*, $R_g$ and X into Equation 3 or by substituting *a*, *b*, $R_o$ and X into Equation 4.

The coatings of this invention have a Kubelka-Munk scattering coefficient greater than or equal to 0.1 reciprocal mil at 560 nanometers. More often the Kubelka-Munk scattering coefficient is greater than or equal to 0.5 reciprocal mil at 560 nanometers. It is preferred that the Kubelka-Munk scattering coefficient be greater than or equal to 1.0 reciprocal mil at 560 nanometers. In determining whether a particular coating falls under the aforementioned criteria, the coatings may be tested by methods known in the art, reference, of course, being made to the equations indicated hereinabove.

Cured coatings of the ultraviolet light curable coating composition of the invention usually have thicknesses in the range of from about 0.3 to about 100 mils. More often they have thicknesses in the range of from about 0.5 to about 10 mils.

Any suitable source which emits ultraviolet light, viz., electromagnetic radiation having a wavelength in the range of from about 1800 to about 4000 Angstrom units, may be used in the practice of this invention. Suitable sources are mercury arcs, carbon arcs, low pressure mercury lamps, medium pressure lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431.

The time of exposure to ultraviolet light and the intensity of the ultraviolet light to which the coating composition is exposed may vary greatly. Generally, the initial treatment with ultraviolet light should continue until the B-stage is reached. Exposure of the gelled composition to ultraviolet light, to heat or to both ultraviolet light and heat should continue until the C-stage is reached.

Although the transformations from uncrosslinked coating composition (A-stage) to B-stage and from B-stage to C-stage may be the result of two or more discrete exposures to ultraviolet light and/or heat, it is preferred that both transformations are attained during a single exposure without interruption. In accordance with this preferred embodiment, the substrate is coated with the ultraviolet light curable coating composition and exposed to ultraviolet light, with or without heat, until gellation, phase separation, curing and dendritic microfracturing have all occurred. Upon removal from the exposure zone, the substrate is coated with a firm, adherent, opaque coating. Because heat aids in dendritic microfracturing, it is especially preferred that the coated substrate be exposed to both ultraviolet light and heat. Often the heat generated by the ultraviolet light source itself is sufficient. For this reason sources such as the medium or high pressure mercury vapor lamps are preferred for use. The temperatures to which the coating is raised may be any that do not significantly degrade the coating.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chronium, zinc and alloys.

In the illustrative examples which follow, all parts are parts by weight and percentages are percent by weight unless otherwise specified.

EXAMPLE I

A polyester resin solution is prepared in the conventional manner by reacting 151 parts propylene glycol, 120 parts diethylene glycol and 329 parts fumaric acid in the presence of 0.6 part triphenyl phosphite, 0.124 part methyl hydroquinone and 161 parts vinyl toluene to produce a solution containing 75 percent solids and having a Gardner-Holdt viscosity of E–F. The acid number of the polyester resin is in the range of 30–40.

Sixty parts of styrene and 40 parts of poly(vinyl acetate) (AYAF; Union Carbide Corp.) having a molecular weight of about 50,000 are blended to form a styrene-poly(vinyl acetate) solution.

A coating composition is prepared by admixing 42 parts of the above polyester resin solution, 36 parts of the above styrene-poly(vinyl acetate) solution, 4.2 parts styrene, 1.6 parts isobutyl benzoin ether and 16.2 parts 2-ethyl hexanol.

Hardboard and aluminum panels are coated with the above coating composition. The coated substrates are passed once at 30 feet per minute through an ultraviolet light curing apparatus containing four Hanovia medium pressure mercury vapor lamps operating at 200 watts/inch. The bulb to substrate spacing is 3¼ inches. Cured coatings having a thickness of about 5 mils and showing good white opacity and essentially complete hiding are the result.

EXAMPLE II

A first coating composition is prepared by admixing 31.4 parts of the polyester resin solution of Example I, 3.0 parts styrene, 5.0 parts inorganic treated hydrogel silica having an average particle size of about 7 microns (Syloid 308; W. R. Grace & Co.), 1.0 part isobutyl benzoin ether and 12.5 parts 2-ethyl hexanol.

A second coating composition is prepared by admixing 52.9 parts of the above first coating composition and 26.0 parts of the styrene-poly(vinyl acetate) solution of Example I.

Separate, unsealed hardboard panels are coated respectively with the first coating composition and with the second coating composition and passed once at 10 feet per minute through the ultraviolet light curing apparatus of Example I. Cured coatings having a film thickness of about 3 mils result. The cured coating of the first coating composition which contains no thermoplastic polymer shows only a very slight haze and very little hiding. The cured coating of the second coating composition which contains thermoplastic polymer shows very good white opacity and exhibits essentially complete hiding. This illustrates the importance of the thermoplastic polymer in the coating compositions of the invention.

EXAMPLE III

One mole of bisphenol A-diglycidyl ether (Epon 828; Shell Chemical Co.) is reacted with two moles acrylic acid to produce the diacrylate of bisphenol A-diglycidyl ether.

Sixty parts vinyl toluene and 40 parts AYAF poly(vinyl acetate) are blended to form a vinyl toluene-poly(vinyl acetate) solution.

A stock composition is prepared by admixing 28.2 parts of the polyester resin solution of Example I, 33.0 parts of the above vinyl toluene-poly(vinyl acetate) solution, 4.8 parts vinyl toluene, 3.9 parts N-vinyl-2-pyrrolidone, 2.8 parts wax coated hydrogel silica having an average particle size of about 7 microns (Syloid 161; W. R. Grace & Co.), 26.4 parts of the above diacrylate of bisphenol A-diglycidyl ether and 2.5 parts isobutyl benzoin ether.

A first coating composition is prepared by admixing 101.6 parts of the above stock composition and 10.0 parts xylene.

A second coating composition is prepared by admixing 101.6 parts of the above stock composition and 10.0 parts methyl n-butyl ketone.

A third coating composition is prepared by admixing 101.6 parts of the above stock composition and 10.0 parts methyl ethyl ketone.

A fourth coating composition is prepared by admixing 101.6 parts of the above stock composition and 15.0 parts 2-ethylhexanol.

Each of the above coating compositions is coated on separate substrates. The coated substrates are passed once at 30 feet per minute through the ultraviolet light curing apparatus of Example I. Cured white coatings having thicknesses in the range of from about 3 to about 3.5 mils and exhibiting good opacity and good hiding result. The cured coating of the fourth coating composition showed the best white.

EXAMPLE IV

A polyester resin is prepared in the conventional manner by reacting 272.8 parts ethylene glycol and 296 parts phthalic anhydride in the presence of 0.57 part butyl stannoic acid. The Gardner-Holdt viscosity is Z-2+ and the acid number of the polyester is about 0.84.

A polyester diacrylate is prepared by reacting 777 parts of the above polyester resin and 475 parts acrylic acid in the presence of 2290 parts toluene, 9.6 parts hydroquinone, 28.7 parts sulfuric acid, 170 parts n-hexane, 25 parts sodium sulfate and 150 parts methanol. The solvents are removed by distillation leaving a polyester diacrylate composition having a solids content of 99+ percent, a Gardner-Holdt viscosity of U-V and an acid number of about 2.

A yellow pigment composition is prepared by admixing 80 parts of the above polyester diacrylate composition and 20 parts Indo Yellow lake.

A pigmented coating composition is prepared by admixing 100 parts of the second coating composition of Example II and 4 parts of the above yellow pigment composition.

A substrate is coated with the above pigmented coating composition and passed once at 10 feet per minute through the ultraviolet light curing apparatus of Example I. A cured yellow coating having a thickness of about 3 mils results. The cured coating exhibits good opacity, essentially complete hiding and excellent color development.

EXAMPLE V

A first blue pigment composition is prepared by admixing 85 parts of the second coating composition of Example II and 15 parts Phthalo Blue pigment.

A second blue pigment composition is prepared by admixing 50 parts of the second coating composition of Example II and 1.7 parts of the above first blue pigment composition.

A pigmented coating composition is prepared by admixing 100 parts of the pigmented coating composition of Example IV and a trace of the above second blue pigment composition.

A substrate is coated with the above pigmented coating composition and passed once at 10 feet per minute through the ultraviolet light curing apparatus of Example I. A cured, light avocado coating having a thickness of about 3 mils results. The cured coating exhibits good opacity, essentially complete hiding and excellent color development.

EXAMPLE VI

A polyester resin is prepared in a conventional manner by reacting 232 parts ethylene glycol and 262 parts hexahydrophthalic anhydride in the presence of 0.494 part butyl stannoic acid. The Gardner-Holdt viscosity is Y- and the acid number of the polyester is about 0.79.

A polyester diacrylate is prepared by reacting 412 parts of the above polyester resin and 267 parts acrylic acid in the presence of 5 parts hydroquinone and 16 parts sulfuric acid. The resulting polyester diacrylate composition has a solids content of about 98.1 percent, a Gardner-Holdt viscosity of about T and an acid number of about 0.44.

A red pigment composition is prepared by admixing 88 parts of the above polyester diacrylate composition and 12 parts Monastral Red pigment.

A pigmented coating composition is prepared by admixing 100 parts of the pigmented coating composition of Example IV and 2 parts of the above red pigment composition.

A substrate is coated with the above pigmented coating composition and passed once at 10 feet per minute through the ultraviolet light curing apparatus of Example I. A cured orange coating having a thickness of about 3 mils results. The cured coating exhibits good opacity, essentially complete hiding and excellent color development.

EXAMPLE VII

Neopentyl glycol diacrylate is prepared by reacting 1150 parts neopentyl glycol and 1830 parts acrylic acid in the presence of 66.5 parts hydroquinone, 165 parts p-toluene sulfonic acid, 385 parts cyclohexane and 5.2 parts p-methoxyphenol. The solvent is removed by distillation leaving a neopentyl glycol diacrylate composition having a solids content of 99+ percent, a Gardner-Holdt viscosity of A- and an acid number of about 1.

A blue pigment composition is prepared by admixing 70 parts of the above neopentyl glycol diacrylate composition and 30 parts of Shephard Blue pigment.

A pigmented coating composition is prepared by admixing 100 parts of the pigmented coating composition of Example IV and 2 parts of the above blue pigment composition.

A substrate is coated with the above pigmented coating composition and passed once at 10 feet per minute through the ultraviolet light curing apparatus of Example I. A cured green coating having a thickness of about 3 mils results. The cured coating exhibits good opacity, essentially complete hiding and excellent color development.

EXAMPLE VIII

A pigmented coating composition is prepared by admixing 100 parts of the pigmented coating composition of Example IV and 4 parts of the blue pigment composition of Example VII.

A substrate is coated with the above pigmented coating composition and passed once at 10 feet per minute through the ultraviolet light curing apparatus of Example I. A cured blue-green coating having a thickness of about 3 mils results. The cured coating exhibits good opacity, essentially complete hiding and excellent color development.

EXAMPLE IX

A polyester resin is prepared in a conventional manner by reacting 221.5 parts propylene glycol, 92.7 parts diethylene glycol and 285.7 parts maleic anhydride in the presence of 0.13 part tert-butyl hydroquinone and 0.6 part triphenyl phosphite. The acid number of the polyester is about 3.5.

Seventy-five parts of the above polyester resin composition is blended with 25 parts styrene to form a styrene-polyester resin composition.

A coating composition is prepared by admixing 314 parts of the above styrene-polyester resin composition, 125 parts 2-ethylhexanol, 50 parts Syloid 308 silica, 30 parts styrene, 260 parts of the styrene-poly(vinyl acetate) solution of Example I and 10 parts isobutyl benzoin ether.

A filled fiberboard panel is coated with the above coating composition using a 0.050 wire wound drawbar and passed once at 20 feet per minute through the ultraviolet light curing apparatus of Example I. A cured coating having a thickness of about 2.8–3.0 mils results.

The cured coating exhibits good white opacity and good hiding.

An unsealed, unfilled tempered hardboard panel is coated with the above coating composition using a 0.050 wire wound drawbar and passed once at 20 feet per minute through the ultraviolet light curing apparatus of Example I. A cured coating having a thickness of about 2.8 – 3.0 mils results. The cured coating exhibits good white opacity and good hiding.

Three unsealed, unfilled, tempered hardboard panels are coated with the above coating composition using a 0.070 wire wound, drawbar and passed at 15, 20 and 30 feet per minute, respectively, through the ultraviolet light curing apparatus of Example I. Cured coatings having a thickness of about 3.5 mils result. Each cured coating exhibits good white opacity and essentially complete hiding.

EXAMPLE X

Sixty parts of styrene and 40 parts of methacrylic acid modified poly(vinyl acetate) having a molecular weight of about 50,000, (LP-40A; Union Carbide Corp.) are blended to form a styrene-acrylic modified poly(vinyl acetate) solution.

A coating composition is prepared by admixing 50 parts of the above styrene-acrylic modified poly(vinyl acetate) solution, 50 parts of the polyester resin solution of Example I and 2 parts isobutyl benzoin ether.

A hardboard panel is coated with the above coating composition and passed seven times at 50 feet per minute through the ultraviolet light curing apparatus of Example I. A cured white coating which exhibits good opacity and hiding results.

EXAMPLE XI

A coating composition is prepared by admixing 45 parts of the coating composition of Example X and 20 parts barytes.

A hardboard panel is coated with the above coating composition and cured in the ultraviolet light curing apparatus of Example I. A cured white coating which exhibits good opacity and hiding results.

EXAMPLE XII

A coating composition is prepared by admixing 96 parts of the coating composition of Example X and 4 parts Syloid 308 silica.

A hardboard panel is coated with the above coating composition and cured in the ultraviolet light curing apparatus of Example I. A cured coating which exhibits good opacity and hiding results.

EXAMPLE XIII

A coating composition is prepared by admixing 33 parts of the styrene-acrylic modified poly(vinyl acetate) solution of Example X, 33 parts of the polyester resin solution of Example I, 1.3 parts isobutyl benzoin ether, 9 parts 2-ethylhexanol and 25 parts barytes.

Two substrates are coated with the above coating composition. One coated substrate is passed seven times at 50 feet per minute and the other three times at 25 feet per minute through the ultraviolet light curing apparatus of Example I. Cured white coatings having a thickness of about 5 mils and showing good opacity, good film appearance, and good speed of white formation are the result.

Two additional substrates are coated with a greater thickness of the above coating composition. One coated substrate is passed seven times at 50 feet per minute and the other, three times at 25 feet per minute through the ultraviolet light curing apparatus of Example I. Cured white coatings having a thickness of about 8 mils and showing good opacity, good film appearance and good speed of white formation are the result.

EXAMPLE XIV

A coating composition is prepared by admixing 43 parts of the styrene-acrylic modified poly(vinyl acetate) solution of Example X, 43 parts of the polyester resin solution of Example I, 2.0 parts isobutyl benzoin ether, 10 parts 2-ethyl hexanol and 4 parts Syloid 308 silica.

Two substrates are coated with the above coating composition. One coated substrate is passed seven times at 50 feet per minute and the other, three times at 25 feet per minute through the ultraviolet light curing apparatus of Example I. Cured white coatings having a thickness of about 5 mils and showing good opacity, good film appearance and good speed of white formation are the result.

Two additional substrates are coated with a greater thickness of the above coating composition. One coated substrate is passed seven times at 50 feet per minute and the other, three times at 25 feet per minute through the ultraviolet light curing apparatus of Example I. Cured white coatings having a thickness of about 8 mils and showing good opacity, good film appearance and good speed of white formation are the result.

EXAMPLE XV

Intermediate A is prepared by admixing 50 parts of the styrene-poly(vinyl acetate) solution of Example I, 50 parts of the polyester resin solution of Example I and 1.6 parts isobutyl benzoin ether.

Intermediate B is prepared by admixing 60 parts of the styrene-poly(vinyl acetate) solution of Example I, 50 parts of the polyester resin solution of Example I and 1.4 parts isobutyl benzoin ether.

Intermediate C is prepared by admixing 31.0 parts of the styrene-poly(vinyl acetate) solution of Example I, 31.4 parts of the polyester resin solution of Example I, and 1.0 part isobutyl benzoin ether.

Intermediate D is prepared by admixing 26.0 parts of the styrene-poly(vinyl aceytate) solution of Example I, 31.4 parts of the polyester resin solution of Example I, 1.0 part isobutyl benzoin ether and 3.0 parts styrene.

Several coating compositions are prepared by admixing various amounts of one or more of the above intermediates, 2-ethylhexanol and barium sulfate.

Each of the coating compositions is coated on both sealed black paper and sealed white paper. The coated substrates are passed once at 10 feet per minute through the ultraviolet light curing apparatus of Example I. Cured white coatings having a thickness of about 4 mils result.

The percent reflectance of each coating is determined by a Gardner Color Eye.

The contrast ratio of each coating is calculated by dividing the reflectance of the coating over the white substrate by the reflectance of the coating over the black substrate.

The proportions of the various components of the coating compositions and the resulting constrast ratios are shown in Table 1.

CONTRAST RATIOS FOR VARIOUS ULTRAVIOLET LIGHT CURED COATINGS

| COATING NO. | INTER-MEDIATE A | INTER-MEDIATE B | INTER-MEDIATE C | INTER-MEDIATE D | 2-ETHYLHEXANOL | BARIUM SULFATE | CONTRAST RATIO |
|---|---|---|---|---|---|---|---|
| 1 | 77.5 | | | | 2.5 | 20 | 71.9 |
| 2 | | 77.5 | | | 2.5 | 20 | 8.7 |
| 3 | 72.5 | | | | 7.5 | 20 | 83.4 |
| 4 | | 72.5 | | | 7.5 | 20 | 50.8 |
| 5 | 67.5 | | | | 2.5 | 30 | 66.2 |
| 6 | | 67.5 | | | 2.5 | 30 | 13.3 |
| 7 | 62.5 | | | | 7.5 | 30 | 85.1 |
| 8 | | 62.5 | | | 7.5 | 30 | 73.9 |
| 9 | | | | 61.4 | 7.5 | 30 | 76.3 |
| 10 | | | 63.4 | | 7.5 | 30 | 82.4 |
| 11 | | | | 61.4 | 10.5 | 30 | 90.0 |
| 12 | | | 63.4 | | 10.5 | 30 | 81.6 |
| 13 | | | 31.7 | 30.7 | 9.0 | 30 | 81.6 |

EXAMPLE XVI

Sixty parts N-vinylpyrrolidone and 40 parts AYAF poly(vinyl acetate) are blended to form an N-vinylpyrrolidone-poly(vinyl acetate) solution.

A coating composition is prepared by admixing 31.4 parts of the polyester resin solution of Example I, 26.0 parts of the above N-vinylpyrrolidone-poly(vinyl acetate) solution, 12.5 parts 2-ethylhexanol, 5.0 parts Syloid 308 silica, 3.0 parts styrene and 1.0 part isobutyl benzoin ether.

A substrate is coated with the above coating composition and cured in the ultraviolet light curing apparatus of Example I. A cured coating which exhibits good opacity and hiding results.

EXAMPLE XVII

One mole of neopentyl glycol (viz., 2,2-dimethylpropane-1,3-diol) is reacted with two moles ethylene oxide to produce 5,5-dimethyl-3,7-dioxanonane-1,9-diol. One mole of 5,5-dimethyl-3,7-dioxanonane-1,9-diol is reacted with two moles acrylic acid to produce 1,9-diacrylyloxy-5,5-dimethyl-3,7-dioxanonane.

Eighty parts 1,9-diacrylyloxy-5,5-dimethyl-3,7-dioxanonane and 40 parts AYAF poly(vinyl acetate) are blended to form a diacrylate-poly(vinyl acetate) solution.

A coating composition is prepared by admixing 35.0 parts 1,9-diacrylyloxy-5,5-dimethyl-3,7-dioxanonane,5.0 parts high boiling aliphatic naphtha (Isopar M; Enjay), 5.0 parts Syloid 308 silica, 1.0 part isobutyl benzoin ether and 31 parts of the above diacrylate-poly(vinyl acetate) solution.

A substrate is coated with the above coating composition. The coated substrate is passed into an ultraviolet light curing apparatus containing one Sylvania medium pressure mercury vapor lamp operating at 330 watts/inch. The bulb to substrate spacing is one inch. During exposure, the bulb and the coated substrate are maintained in a nitrogen atmosphere which is substantially oxygen-free. The coated substrate is held under the lamp for about 5 seconds. A cured coating showing very good whiteness and high hiding results.

Two additional substrates are coated with the above coating composition. One is passed three times at 100 feet per minute through the above ultraviolet light curing apparatus containing a nitrogen atmosphere. The other coated substrate is passed once at 30 feet per minute through the above ultraviolet light curing apparatus containing a nitrogen atmosphere.

All three ultraviolet light irradiated coated substrates are baked in air at 350° F. for 10 minutes. Three cured white coatings exhibiting high hiding result.

EXAMPLE XVIII

A polyester resin composition is prepared in the conventional manner by reacting 980 parts maleic anhydride, 494 parts propylene glycol and 530 parts diethylene glycol in the presence of 2.0 parts triphenyl phosphite and 0.7 part methyl hydroquinone to produce a composition containing 99.8 percent solids and having an acid number of 29.1.

Seventy parts of the above polyester composition, 30 parts diacetone acrylamide and 10 parts water are blended to form a polyester-diacetone acrylamide composition.

A coating composition is prepared by admixing 30.4 parts of the above polyester-diacetone acrylamide composition, 33.0 parts of the N-vinylpyrrolidone-poly(vinyl acetate) solution of Example XVI, 13.0 parts deionized water and 1.0 part isobutyl benzoin ether.

Two substrates are coated with the above coating composition. One coated substrate is passed once at 10 feet per minute through the ultraviolet light curing apparatus of Example I. The other coated substrate is passed four times at 10 feet per minute through the ultraviolet light curing apparatus of Example I. Cured white coatings having a thickness of about 6 mils and showing good opacity and hiding result.

EXAMPLE XIX

A coating composition is prepared by admixing 30.0 parts of the polyester-diacetone acrylamide composition of Example XXII, 33.0 parts of the N-vinylpyrrolidone-poly(vinyl acetate) solution of Example XVI, 13.0 parts deionized water and 1.0 part isobutyl benzoin ether.

A substrate is coated with the above coating composition and passed once at 10 feet per minute through the ultraviolet light curing apparatus of Example I. A cured white coating having a thickness of about 6 mils and showing good opacity and hiding results.

EXAMPLE XX

Three intermediate compositions are each prepared by admixing 39.8 parts of the polyester resin solution of Example I, 15.84 parts 2-ethylhexanol, 6.34 parts Syloid 308 silica, 1.27 parts isobutyl benzoin ether and 3.80 parts styrene.

Sixty parts of styrene and 40 parts of poly(vinyl acetate) (AYAC; Union Carbide Corp.) having a molecular weight of about 100,000 are blended to form a first styrene-poly(vinyl acetate) solution.

Sixty parts of styrene and 40 parts of poly(vinyl acetate) (AYAT; Union Carbide Corp.) having a molecular weight of about 10,000 to about 20,000 are blended to form a second styrene-poly(vinyl acetate) solution.

A first coating composition is prepared by admixing 32.95 parts of the above first styrene-poly(vinyl acetate) solution and one of the above intermediate compositions (67.05 parts).

A second coating composition is prepared by admixing 32.95 parts of the styrene-poly(vinyl acetate) solution of Example I and another of the above intermediate compositions (67.05 parts).

A third coating composition is prepared by admixing 32.95 parts of the above second styrene-poly(vinyl acetate) solution and the third of the above intermediate compositions (67.05 parts).

Each of the coating compositions are coated onto aluminum substrates and hardboard panels. The coated aluminum substrates and the coated hardboard panels are passed twice at 20 feet per minute through the ultraviolet light curing apparatus of Example I. Cured white coatings showing good white opacity result. Several cured coatings on the aluminum substrates had thicknesses in the range of from about 0.9 to about 3.3 mils while others had thicknesses of about 6.5 mils. Cured coatings on the hardboard panels had thicknesses of about 3.3 mils. On both the aluminum substrates and the hardboard panels and at all thicknesses, coatings of the second coating composition were very slightly faster in developing microcracking and whiteness than coatings of the first and third coating compositions.

EXAMPLE XXI

One mole of Epon 828 bisphenol A-diglycidyl ether is reacted with two moles acrylic acid to produce the diacrylate of bisphenol A-diglycidyl ether.

A first coating composition is prepared by admixing 38.1 parts of the diacrylate of bisphenol A-diglycidyl ether of Example III, 16.3 parts diisobutyl ketone, 18.1 parts poly(vinyl acetate), 27.1 parts N-vinylpyrrolidone and 1.3 parts isobutyl benzoin ether.

A second coating composition is prepared by admixing 38.1 parts of the above diacrylate of bisphenol A-diglycidyl ether, 16.3 parts diisobutyl ketone, 8.1 parts poly(vinyl acetate), 37.1 parts N-vinylpyrrolidone and 1.3 parts isobutyl benzoin ether.

A third coating composition is prepared by admixing 44.5 parts of the above diacrylate of bisphenol A-diglycidyl ether, 19.0 parts diisobutyl ketone, 6.4 parts poly(vinyl acetate), 29.7 parts N-vinylpyrrolidone and 1.3 parts isobutyl benzoin ether.

Each of the above coating compositions is coated on separate substrates and cured in the ultraviolet light curing apparatus of Example I. Cured white coatings which exhibit good opacity and hiding result. The first coating composition yields a cured coating having the best coating appearance. The third coating composition gives a cured coating having the best white.

EXAMPLE XXII

An intermediate solution is prepared by admixing 75 parts of the diacrylate of bisphenol A-diglycidyl ether of Example III, 20 parts diacetone acrylamide and 6 parts water.

Sixty parts N-vinylpyrrolidone and 40 parts AYAC poly(vinyl acetate) are blended to form a first N-vinylpyrrolidone-poly(vinyl acetate) solution.

Sixty parts N-vinylpyrrolidone and 40 parts AYAT poly(vinyl acetate) are blended to form a second N-vinylpyrrolidone-poly(vinyl acetate) solution.

A first coating composition is prepared by admixing 39.2 parts of the above intermediate solution, 7.3 parts of a urea-formaldehyde resin composition (uformite F-240; Rohm & Haas Co.) having 60 percent solids (solvents are xylol-butanol 1:1.5), 32.9 parts of the above first N-vinylpyrrolidone-poly(vinyl acetate) solution, 6.3 parts Syloid 161 silica, 1.3 parts isobutyl benzoin ether and 12.9 parts methyl ethyl ketone.

A second coating composition is prepared by admixing 39.2 parts of the above intermediate solution, 7.3 parts of the above urea-formaldehyde resin composition, 32.9 parts of the N-vinylpyrrolidone-poly(vinyl acetate) solution of Example XVI, 6.3 parts Syloid 161 silica, 1.3 parts isobutyl benzoin ether and 12.9 parts methyl ethyl ketone.

A third coating composition is prepared by admixing 39.2 parts of the above intermediate solution, 7.3 parts of the above urea-formaldehyde composition, 32.9 parts of the above second N-vinylpyrrolidone-poly(vinyl acetate) solution, 6.3 parts Syloid 161 silica, 1.3 parts isobutyl benzoin ether and 12.9 parts methyl ethyl ketone.

A fourth coating composition is prepared by admixing 39.2 parts of the above intermediate solution, 7.3 parts of the above urea-formaldehyde composition, 32.9 parts of the N-vinylpyrrolidone-poly(vinyl acetate) solution of Example XVI, 6.3 parts Syloid 161 silica, 1.3 parts isobutyl benzoin ether and 12.9 parts 2-ethylhexanol.

A fifth coating composition is prepared by admixing 39.2 parts of the above intermediate solution, 7.3 parts of the above urea-formaldehyde solution, 32.9 parts of the N-vinylpyrrolidone-poly(vinyl acetate) solution of Example XVI, 6.3 parts Syloid 161 silica, 1.3 parts isobutyl benzoin ether and 12.9 parts diisobutyl ketone.

Each of the above coating compositions is coated on separate substrates and cured in the ultraviolet light curing apparatus of Example I. Cured white coatings having thicknesses in the range of from about 0.8 to about 1.0 mil and exhibiting good opacity and good hiding result. Each of the above coating compositions is again coated on separate substrates and cured in the ultraviolet light curing apparatus of Example I. Cured white coatings having thicknesses in the range of from about 3.2 to about 3.8 mils and showing good opacity and good hiding result.

EXAMPLE XXIII

A reactor equipped with a thermometer, an agitator and a source of nitrogen is charged with 1105 parts methyl butyl ketone, 342 parts methyl isobutyl ketone, 500 parts of a polycaprolactone polyol (reaction product of ε-caprolactone and diethylene glycol; molecular weight 1250; Niax Polyol PCP-0230, Union Carbide Corporation), 500 parts poly(hexanediol-1,6 adipate) (molecular weight~1000; Formrez 14-55, Witco Chemical Co.), 594 parts bis(4-isocyanatocyclohexyl)methane, 87 parts 2,2-dimethyl-3-hydroxypropyl 2,2-dimethyl-3-hydroxypropionate, 60 parts 2,2-dimethylolpropionic acid, 77 parts 1,1,1-trimethylolpropane, and 1.71 parts of a one percent solution of dibutyl tin dilaurate in methyl butyl ketone and heated to 100° C. A nitrogen blanket is maintained throughout the reaction. Two hours and twenty minutes later (temperature 88° C.), 8.1 parts 1,4-diazabicyclo [2.2.2] octane is added. The temperature is held at 88° C. for the next 3½ hours. Cooling is begun and 30 minutes later, the temperature is 78° C. Over the next 55 minutes, the temperature is raised to 82° C. and 13.1 parts monoethanolamine is charged. Twenty-three minutes later (temperature 85° C.), 57 parts of a polycaprolactone polyol (reaction product of ϵ-caprolactone and trimethylolpropane; molecular weight 300; Niax Polyol PCP-301, Union Carbide Corporation is added. Thirty minutes later (temperature 83° C.), 150 parts n-butanol is added and heat is applied. One hour and fifteen minutes later, the temperature is 99° C. The temperature is held at 99° C. for 1 hour and 21 parts N-hydroxyethyl ethylenimine and 5 parts methyl butyl ketone are added. One hour later (temperature 99° C.) cooling and the addition of 449 parts isopropanol are begun. Ten minutes later (temperature 83° C.), the addition of isopropanol is completed. After 25 minutes, the temperature is 60° C. and the resulting product is discharged into storage containers and allowed to cool to room temperature. The product has a solids content of 48.9 percent, an acid number of 3.2 and a Gardner-Holdt viscosity of $Y^+$.

A resin composition is prepared by removing the volatile solvents from the above product. This is accomplished by baking a quantity of the above product at 121° C. until the rate of loss of weight is substantially zero.

An intermediate composition is prepared by admixing 25 parts of the above resin composition and 75 parts N-vinylpyrrolidone.

A coating composition is prepared by admixing 22.7 parts of the above intermediate composition, 39.2 parts of the intermediate solution of Example XXII, 7.3 parts of the urea-formaldehyde resin composition of Example XXII, 10.2 parts N-vinylpyrrolidone, 12.9 parts 2-ethylhexyl acetate, 6.3 parts Syloid 161 silica and 1.3 parts isobutyl benzoin ether.

The above coating composition is coated onto a substrate and cured in the ultraviolet light curing apparatus of Example I. A cured white coating exhibiting good opacity and good hiding results.

EXAMPLE XXIV

A stock composition is prepared by admixing 39.2 parts of the intermediate solution of Example XXII, 7.3 parts of the urea-formaldehyde resin composition of Example XXII, 18.7 parts N-vinylpyrrolidone, 12.9 parts 2-ethylhexyl acetate, 6.3 parts Syloid 161 silica and 1.3 parts isobutyl benzoin ether.

Sixty parts N-vinylpyrrolidone and 40 parts cellulose acetate butyrate solution (0.2 second grade; Eastman Chemicals) are blended to form a N-vinylpyrrolidone-cellulose acetate butyrate solution.

A first coating composition is prepared by admixing 85.7 parts of the above stock composition and 32.9 parts of the above N-vinylpyrrolidone-cellulose acetate butyrate solution.

A second coating composition is prepared by admixing 50 parts of the above first coating composition and 50 parts of the above stock composition.

A third coating composition is prepared by admixing 85.7 parts of the above stock composition and 14.2 parts of the above N-vinylpyrrolidone-cellulose acetate butyrate solution.

A fourth coating composition is prepared by admixing 50 parts of the above third coating composition and 50 parts of the above stock composition.

Each of the above coating compositions is coated on aluminum substrates. Two individual substrates are used for each coating composition. Four such substrates, each bearing one of the four coating compositions described above, is passed once at 40 feet per minute through the ultraviolet light curing apparatus of Example I. The remaining four aluminum substrates, each bearing one of the four coating compositions described above, is passed once at 60 feet per minute through the ultraviolet light curing apparatus of Example I. Eight cured white coatings having thicknesses of about one mil and exhibiting good opacity and good hiding result.

EXAMPLE XXV

A coating composition is prepared by admixing 39.80 parts of the polyester resin solution of Example I, 15.84 parts 2-ethylhexanol, 6.34 parts Syloid 308 silica, 1.29 parts isobutyl benzoin ether, 3.80 parts styrene and 32.95 parts of the styrene-poly(vinyl acetate) solution of Example I.

Two substrates, each having two regions, one region being a black background of near zero reflectance and the other region being a white background of a Morest paper having a reflectance of 0.812, are coated with the above coating composition and passed once at 30 feet per minutes through the ultraviolet light curing apparatus of Example I. Cured coatings having film thicknesses of 3.5 mils result. The reflectance of the coating in both regions are measured for each coated substrate and the Kubelka-Munk scattering coefficient is calculated. All reflectances are measured with a General Electric reflectometer. Observations and results are shown in Table 2.

TABLE 2

| | | | | | | | | | | | |
|---|---|---|---|---|---|---|---|---|---|---|---|
| DETERMINATION OF KUBELKA-MUNK SCATTERING COEFFICIENT ||||||||||||
| | COATING | MEASURED ||| | | | QUANTITIES DERIVED FROM ||||
| | THICKNESS, | REFLECTANCES AT 560nm. ||| INTERNAL REFLECTANCES AT 560nm. ||| KUBELKA-MUNK THEORY ||||
| SAMPLE | mils | $R'$ | $R'_0$ | $R'_g$ | $R$ | $R_0$ | $R_g$ | $R_\infty$ | K/S | SX | K | S, mils$^{-1}$ |
| 1 | 3.5 | 0.897 | 0.759 | 0.812 | 0.933 | 0.833 | 0.873 | 1 | 0 | 4.988 | 0 | 1.43 |
| 2 | 3.5 | 0.900 | 0.763 | 0.812 | 0.935 | 0.836 | 0.873 | 1 | 0 | 5.098 | 0 | 1.46 |

We claim:

1. An ultraviolet light curable coating composition which is transmissive of visible and ultraviolet light and which upon curing produces opaque coatings having a Kubelka-Munk scattering coefficient greater than or equal to 0.1 reciprocal mil at 560 nanometers, said ultraviolet light curable coating composition consisting essentially of a mixture of:

a. a first component which shrinks upon curing and which is one or more organic ultraviolet light curable polymers;

b. a second component, which is substantially miscible with said first component at room temperature before said first component is gelled and which is not significantly ultraviolet light curable, selected from the group consisting of organic plasticizers, organic thermoplastic polymers and mixtures thereof; and c. a photoinitiator which under the influence of ultraviolet light produces free radicals, wherein d. said first component and said second component undergo phase separation as said first component gels under the influence of ultraviolet light; and e. dendritic microfractures appear at phase boundaries under the influence of ultraviolet light, heat or both ultraviolet light and heat, which dendritic microfractures function as light scattering sites to thereby provide opacity to cured coatings of said ultraviolet light curable coating composition.

2. The ultraviolet light curable coating composition of claim 1 wherein said organic ultraviolet light curable polymer is an ethylenically unsaturated polyester.

3. The ultraviolet light curable coating composition of claim 1 wherein said second component is an organic thermoplastic polymer.

4. The ultraviolet light curable coating composition of claim 3 wherein said organic thermoplastic polymer is poly(vinyl acetate).

5. The ultraviolet light curable coating composition of claim 3 wherein said organic thermoplastic polymer is cellulose acetate butyrate.

6. The ultraviolet light curable coating composition of claim 1 wherein:

a. the amount of said first component present in said coating composition is in the range of from about 15 to about 74.9 percent by weight of the binder;

b. the amount of said second component present in said coating composition is in the range of from about 1 to about 25 percent by weight of the binder; and c. the amount of said photoinitiator present is in the range of from about 0.01 percent to about 10 percent by weight of the binder.

7. The ultraviolet light curable coating composition of claim 1 additionally containing a vinyl monomer.

8. The ultraviolet light curable coating composition of claim 7 wherein said vinyl monomer is present in an amount in the range of from about 15 to about 30 percent by weight of the binder.

9. The ultraviolet light curable coating composition of claim 7 wherein said vinyl monomer is styrene.

10. The ultraviolet light curable coating composition of claim 1 additionally containing an inert volatile organic solvent.

11. The ultraviolet light curable coating composition of claim 10 wherein said wet volatile organic solvent is present in an amount in the range of from about 1 to about 15 percent by weight of the vehicle.

12. The ultraviolet light curable coating composition of claim 10 wherein said inert volatile organic solvent is methyl isobutyl ketone, 2-ethylhexyl alcohol or aliphatic naphtha.

13. The ultraviolet light curable coating composition of claim 1 wherein said one or more organic ultraviolet light curable polymers is one or more organic ultraviolet light curable oligomers.

14. The ultraviolet light curable coating composition of claim 1 which upon curing produces opaque coatings having a Kubelka-Munk scattering coefficient greater than or equal to 1.0 reciprocal mil at 560 nanometers.

15. An ultraviolet light curable coating composition which is transmissive of visible and ultraviolet light and which upon curing produces opaque coatings having a Kubelka-Munk scattering coefficient greater than or equal to 0.1 reciprocal mil at 560 nanometers, said ultraviolet light curable coating composition consisting essentially of a mixture of:

a. an ethylenically unsaturated polyester which shrinks upon curing and which is present in an amount in the range of from about 15 to about 74.9 percent by weight of the binder;

b. an organic thermoplastic polymer selected from the group consisting of poly(vinyl acetate) and cellulose acetate butyrate and which is present in an amount in the range of from about 1 to about 25 percent by weight of the binder; and c. a photoinitiator which under the influence of ultraviolet light produces free radicals, and which is present in the range of from about 0.01 to about 10 percent by weight of the binder d. said ethylenically unsaturated polyester and said organic thermoplastic polymer undergo phase separation as said ethylenically unsaturated polyester gels under the influence of ultraviolet light; and e. dendritic microfractures appear at phase boundaries under the influence of ultraviolet light, heat or both ultraviolet light and heat, which dendritic microfractures function as light scattering sites to thereby provide opacity to cured coatings of said ultraviolet light curable coating composition.

16. The ultraviolet light curable coating composition of claim 15 containing styrene in an amount in the range of from about 0 to about 30 percent by weight of the binder.

17. The ultraviolet light curable coating composition of claim 15 which upon curing produces opaque coatings having a Kubelka-Munk scattering coefficient of 1.0 reciprocal mil at 560 nanometers.

18. A method comprising:

a. coating a substrate with an ultraviolet light curable coating composition consisting essentially of a visible and ultraviolet light transmissive mixture of:

1. a first component which shrinks upon curing and which is one or more organic ultraviolet light curable polymers;

2. a second component, which is substantially miscible with said first component at room temperature before said first component is gelled and which is not significantly ultraviolet light curable, selected from the group consisting of organic plasticizers and organic thermoplastic polymers; and 3. a photoinitiator which under the influence of ultraviolet light produces free radicals;

b. exposing said coated substrate to ultraviolet light to gel said first component and to cause said first component and said second component to undergo phase separation; then c. exposing said coated substrate to ultraviolet light, heat or both ultraviolet light and heat to cure said first component and to produce dendritic microfractures at phase boundaries, which dendritic microfractures function as light scattering sites to thereby provide opacity to the thusly cured coating of said ultraviolet light curable coating composition, said cured coating having a Kubelka-Munk scattering coefficient greater than or equal to 0.1 reciprocal mil at 560 nanometers.

19. The method of claim 18 wherein both of said exposures are made to the same source of ultraviolet light.

20. The method of claim 19 wherein there is no interruption between said first exposure and said second exposure.

21. The method of claim 20 wherein said source of ultraviolet light is also a source of heat to which said coated substrate is exposed.

22. The method of claim 18 wherein said one or more organic ultraviolet curable polymers is one or more organic ultraviolet light curable oligomers.

23. The method of claim 18 wherein said cured coating has a Kubelka-Munk scattering coefficient greater than or equal to 1.0 reciprocal mil at 560 nanometers.

24. An article comprising a substrate having a cured coating thereon, said coating:
  a. comprising at least two organic phases
    1. one organic phase being one or more cured organic ultraviolet light curable polymers,
    2. the other organic phase being selected from the group consisting of organic plasticizers which are not significantly ultraviolet light curable, organic thermoplastic polymers which are not significantly ultraviolet light curable and mixtures thereof,
    3. both of said organic phases being transmissive of visible light;
  b. containing dendritic microfractures at phase boundaries, which dentritic microfractures function as light scattering sites to thereby provide opacity to said coating; and
  c. having a Kubelka-Munk scattering coefficient greater than or equal to 0.1 reciprocal mil at 560 nanometers.

25. The article of claim 24 wherein the cured coating has a thickness in the range of from about 0.03 to about 100 mils.

26. The article of claim 24 wherein
  a. said first organic phase consists essentially of cured ultraviolet light curable ethylenically unsaturated polyester; and
  b. said other organic phase consists essentially of an organic thermoplastic polymer which is not significantly untraviolet light curable selected from the group consisting of poly(vinyl acetate) and cellulose acetate butyrate.

27. The article of claim 26 wherein said ultraviolet light curable ethylenically unsaturated polyester has been cured with styrene as a crosslinking agent.

28. The article of claim 27 wherein
  a. said cured ultraviolet light curable ethylenically unsaturated polyester is present in said cured coating in an amount in the range of from about 15 to about 74.9 percent by weight of the binder;
  b. said organic thermoplastic polymer is present in said cured coating in an amount in the range of from about 1 to about 25 percent by weight of the binder; and
  c. said styrene is present in said cured coating in an amount in the range of from 0 to about 30 percent by weight of the binder.

29. The article of claim 24 wherein said one or more organic ultraviolet light curable polymers is one or more organic ultraviolet light curable oligomers.

30. The article of claim 24 wherein said coating has a Kubelka-Munk scattering coefficient greater than or equal to 1.0 reciprocal mil at 560 nanometers.

31. An article comprising a substrate having a cured coating thereon, said coating:
  a. comprising at least two organic phases
    1. one organic phase being one or more cured organic ultraviolet light curable polymers
    2. the other organic phase being selected from the group consisting of organic plasticizers which are not significantly ultraviolet light curable, organic thermoplastic polymers which are not significantly ultraviolet light curable and mixtures thereof,
    3. both of said organic phases being transmissive of visible light;
  b. containing dentritic microfractures at phase boundaries, which dendritic microfractures function as light scattering sites to thereby provide opacity to said coating; and
  c. having a Kubelka-Munk scattering coefficient greater than or equal to 0.1 reciprical mil at 560 nanometers; wherein substantially no dentritic microfractures are found near the surface of said coating away from said substrate.

32. The article of claim 31 wherein said coating has a Kubelka-Munk scattering coefficient greater than or equal to 1.0 reciprocal mil at 560 nanometers.

33. The article of claim 31 wherein said coating has a thickness of at least one mil.

* * * * *

UNITED STATES PATENT AND TRADEMARK OFFICE
CERTIFICATE OF CORRECTION

PATENT NO. : 4,005,244
DATED : January 25, 1977
INVENTOR(S) : Marco Wismer, Paul J. Prucnal and Kenneth E. Miller It is certified that error appears in the above-identified patent and that said Letters Patent are hereby corrected as shown below:

Column 30, insert --wherein-- between lines 27 and 28.

Column 31, line 18, insert --light-- after "ultraviolet".

Column 31, line 44, "0.03" should be --0.3--.

Column 32, line 51, insert --about-- after "least".

Signed and Sealed this

Twelfth Day of April 1977

[SEAL]

Attest:

RUTH C. MASON
Attesting Officer

C. MARSHALL DANN
Commissioner of Patents and Trademarks